June 29, 1954     B. C. HAMILTON     2,682,103
MEANS FOR REBUSHING PISTONS AND THE LIKE
Filed Oct. 23, 1950     2 Sheets-Sheet 1
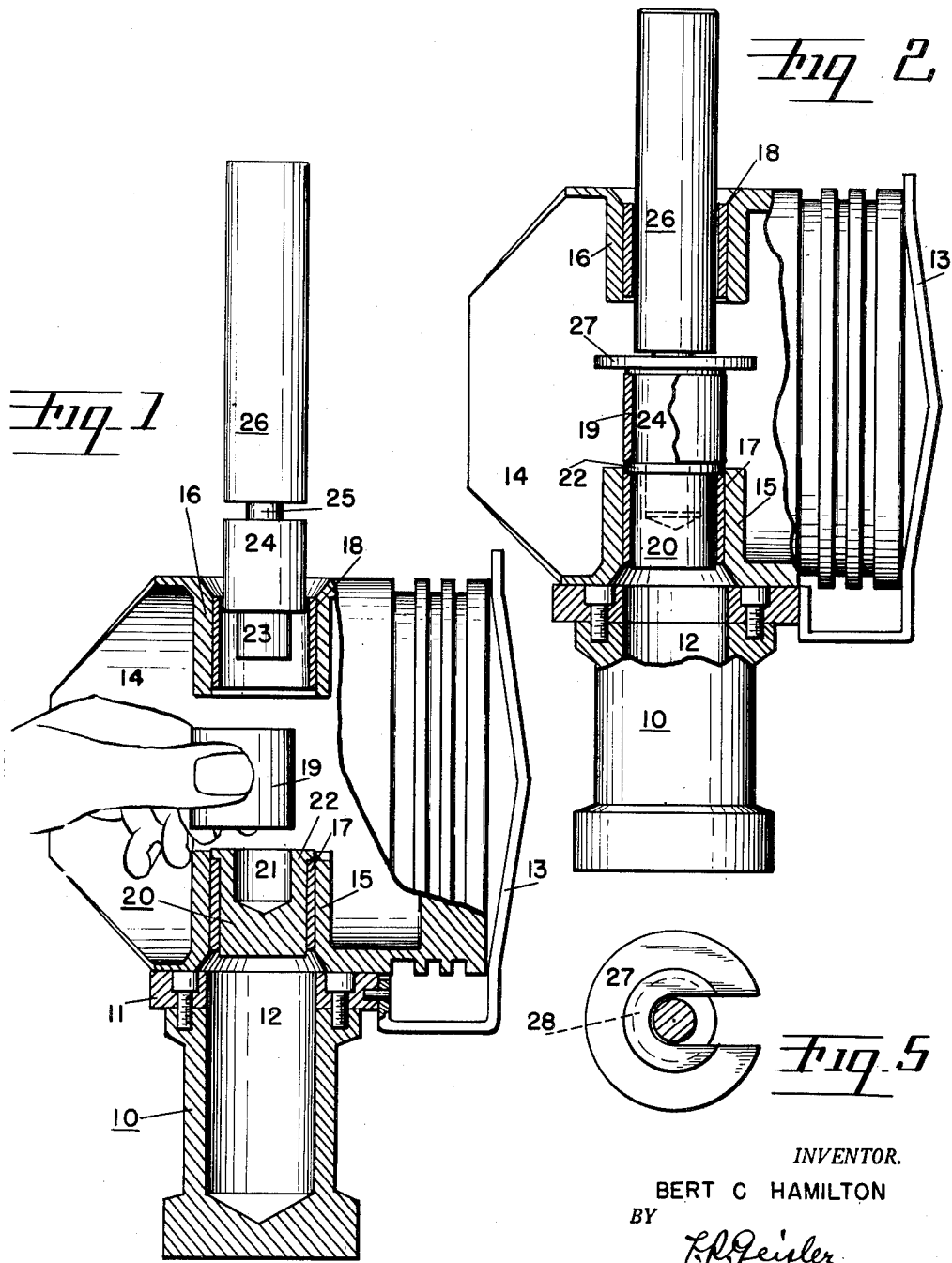
INVENTOR.
BERT C HAMILTON
BY
ATTORNEY

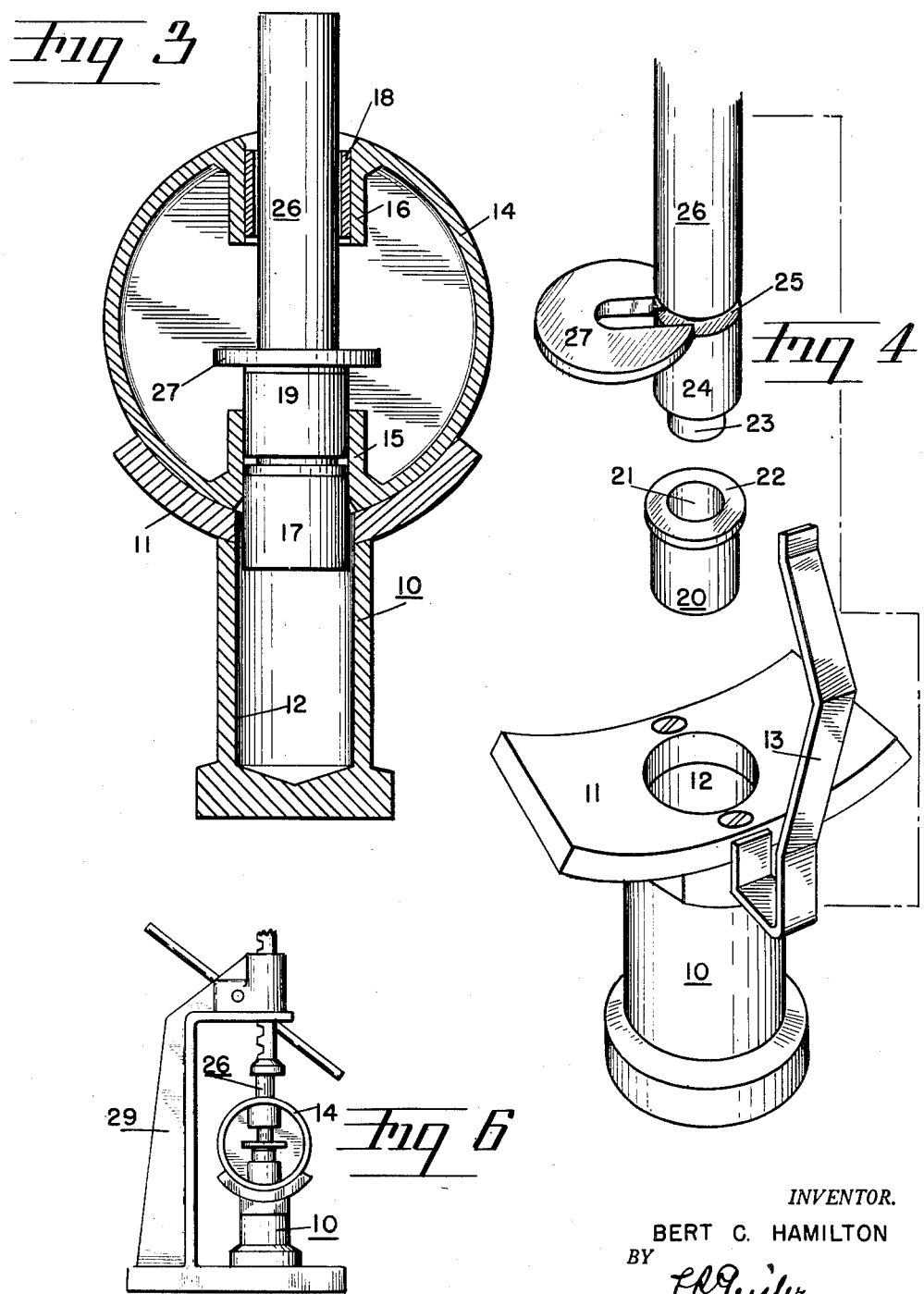

Patented June 29, 1954

2,682,103

UNITED STATES PATENT OFFICE 2,682,103

MEANS FOR REBUSHING PISTONS AND THE LIKE

Bert C. Hamilton, La Grande, Oreg.

Application October 23, 1950, Serial No. 191,530

1 Claim. (Cl. 29—275)

The present invention relates to the removal and replacing of bushings in pairs of spaced, axially-aligned bearings, and, in particular, in the bearings of a piston, such as the well known pistons in the engines of automotive vehicles.

While various means and devices have been employed for replacing bushings and pistons of automotive vehicles, it has been my experience and observation that such means and devices are neither foolproof nor entirely satisfactory, and I have observed numbers of cases in which the rebushing of pistons has resulted in improperly placed or marred bushings or marred piston bearings. A main difficulty in replacing the piston bushings, or the bushings in any pair of similarly axially-aligned bearings is in keeping the tool or instrument by which each bushing is removed or replaced exactly in proper axially-aligned position during the operation. When a cylindrical, hammer-driven rod is used to drive out an old bushing and force in a new bushing in the most customary manner, it is obvious that if the rod axis is held slightly out of alignment, injury to the bearing and to the new bushing will be apt to result. When an old bushing has become stuck in the bearing the use of other common instruments for forcing the old bushing out will be even more apt to damage the bearing. Replacement of piston bushings at present is a troublesome and annoying operation, which is one reason why it is often so carelessly and improperly done by hurried garage mechanics.

An object of this invention is to provide a bushing remover and replacer for axially-aligned, and particularly piston bearings, which will enable each of the bushings to be removed and replaced with a minimum amount of time and effort.

A related object of the invention is to provide an improved bushing replacer, suitable especially for rebushing pistons, in which an old bushing can be removed and a new one set in place in a single operation.

Another object of the invention is to provide an improved piston bushing replacer which will be absolutely foolproof, and in which the element employed to force out the old bushing and drive in the new bushing can never be held out of proper axial alignment during the replacing operation.

A further object of the invention is to provide a practical bushing replacer which can be used satisfactorily by even an entirely unskilled person for replacing piston bushings in an automotive vehicle.

An additional object of the invention is to provide an improved tool assembly for bushing replacing specifically adapted for piston bushings, which will be simple to manufacture and convenient and easy to set up and use.

The way in which the above objects and incidental advantages are attained in my improved rebushing means for pistons will be apparent from the following description with reference to the accompanying drawings forming a part of the disclosure of the invention.

In the drawings:

Fig. 1 is an elevation showing my rebushing means in the act of being employed for replacing a cylinder bushing, a portion of the cylinder being broken away and part of the rebushing assembly being shown in section;

Fig. 2 is a similar elevation, partly in section, showing the next and final stage in arranging my bushing replacing means for the actual operation of replacing one of the piston bushings;

Fig. 3 is a transverse sectional elevation taken through the cylinder and bushing replacing means of Figs. 1 and 2 and showing the bushing replacing operation nearing completion in one of the piston bearings;

Fig. 4 is a perspective view showing the four members of my bushing replacing assembly entirely separated for clarity but arranged in their respective relative positions;

Fig. 5 is a bottom plan view of the split or C-shaped washer constituting one of the members of my bushing replacing assembly; and Fig. 6 is an elevation illustrating how my bushing replacing means may be conveniently employed in combination with a simple press for rebushing a piston.

My rebushing means consists of a composite base member 10 having a pedestal portion with a cylindrical cavity or well 12 extending downwardly from the top, the diameter of the well 12 being slightly greater than the diameter of the bearings in which bushings are to be replaced, and the axial length or depth of the well 12 being considerably greater than the length of the bearings. A work-supporting plate 11, curved, in the example illustrated, to correspond to the curvature of the exterior face of the piston 14, is secured to the pedestal portion of the base member 10 by suitable screws. The curved plate 11 has a central circular opening of the same diameter as the well 12 which is positioned in registration with the well. I have found it convenient also to attach a guide bracket 13 to the base member to facilitate the setting of the piston in place on the base member. The guide bracket 13 is so arranged that the closed end of the piston will rest against the guide bracket when the piston is positioned on the supporting plate 11 with the piston bearings in axial alignment with the well 12. In Figs. 1, 2 and 3 the two bearings for the piston 14 are indicated by the reference characters 15 and 16.

A main member 26, through the intermediary of which the rebushing operations are performed, is a solid cylindrical shaft having a main diameter very slightly less than the interior diameter of the bearing bushings, so that this main member is capable of sliding up and down in the bushings in the two bearings when the piston is set in position on the composite base member 10, and will then be in exact axial alignment with the two bearings.

At the bottom end of the main member 26 is a reduced diameter portion 23. Another intermediate reduced diameter portion or annular groove 25 is spaced from the bottom end of the main member 26 leaving a section 24 (Figs. 1 and 4) of major diameter somewhat longer in length than the length of each of the bushings to be replaced.

A bushing remover member 20 (Figs. 1, 2 and 4) is formed with a cylindrical body of the same diameter as the major portion of the main member 26, and thus its diameter is slightly less than the interior diameter of the bushings to be removed. This bushing remover member 20 has a top annular flange 22, the exterior diameter of which is greater than the interior diameter of the bushings to be removed and very slightly less than the interior diameter of the piston bearings. Thus the flange 22, as shown in Figs. 1 and 2, provides a shoulder which engages the top of the bushing to be removed, such as the bushing 17 in the bearing 15. This member 20 also has a top central cylindrical cavity 21 slightly greater in diameter than the reduced diameter body portion 23 of the main member 26 and its purpose is to accommodate the portion 23 at the start of the rebushing operation, as later explained.

A split or C-shaped washer 27 (Figs. 2, 3, 4 and 5) is adapted to be slid on to the annular groove 25 of the main member 26. This split washer 27 has an exterior diameter considerably greater than the exterior diameter of the bushings to be replaced. On one face, thus the underside face in the arrangement illustrated, this split washer 27 has an annular shoulder 28 (see Fig. 5), the peripheral diameter of which is greater than the interior diameter of the bushings but slightly less than the interior diameter of the bearings. The purpose of this shoulder 28 is to enable a new bushing to be recessed slightly from the inner end of its bearing, and the thickness of the shoulder 28 is equal to the extent to which it is desired to have the bushings recessed.

The manner in which my rebushing means is employed can now be described with reference to Figs. 1, 2, 3 and 6. Let it be assumed that the piston 14 has the usual pair of opposite, axially-aligned bearings 15 and 16 with the bushings 17 and 18 mounted therein respectively, and that these bushings are required to be replaced. The piston 14 is set on the base member 10 with the two bearings 15 and 16 in axial, and thus vertical, alignment, and with the well 12 of the base, also in the same axial alignment, as previously mentioned, one of the bearings, for example, the bearing 15, with its old bushing 17, being bottommost. The bushing remover member 20 is first set in place in the bushing 17, as shown in Fig. 1.

A new bushing 19, which is to be set in place of the old bushing 17, is inserted in the open end of the piston, in the manner illustrated in Fig. 1, and the main member 26 is then slid down through the top bearing 16 and bushing 18 and through the new member 19 until the member 26 comes to rest on the member 20 with the bottom portion 23 resting in the cavity 21. Then the split washer 27, with the shouldered face down, is slid into place on the main member 26 in the groove 25 above the new bushing 19. The various members will now be in the position illustrated in Fig. 2 and ready for the replacement of the bushing in the bearing 15.

A force is now applied to the top of the main member 26 in order to drive this main member downwardly. This force may be furnished by means of hammer blows on the top end of member 26, but preferably the force is supplied by pressure applying means, such as the press 29 shown in Fig. 6. Such downward pressure on member 26 forces the bushing remover 20 downwardly into the well 12, carrying with it the old bushing 17, and at the same time the downwardly moving split washer 27 pushes the new bushing 19 down into place in the bearing 15 (see Fig. 3).

All this is done with a single operation or downward driving of the member 26 and requires only a minimum amount of time and effort. The preparatory setting up of the members and parts in place is a very simple matter requiring practically no care or skill. It is impossible to set the bushing remover 20 in place otherwise than correctly. When the main member 26 is slid down through the top bushing 18 and the reduced bottom portion 23 is inserted in the cavity 21, the member 26 will always be in perfect axial alignment with the bearing in which the bushing is to be replaced and can not get out of such axial alignment during the rebushing no matter how carelessly the operation is then performed. This is an important feature of my invention. The split washer 27 not only pushes the new bushing 19 into place but prevents any possibility of the new bushing being driven down too far into the bearing. If, as illustrated in Figs. 1, 2 and 3, the bushings are to be set in a position slightly recessed from the inner ends of the bearings, this is accomplished by having the shouldered face of the split washer 27 placed down. However, in cases where bushings are to be set flush with the inner ends of the piston bearings, the shouldered face of the split washer 27 is placed up.

When the rebushing of one bearing, thus the bearing 15, has been accomplished, the piston 14 is lifted from the base member 10, the bushing remover 20 and the old bushing 17 are removed from the well 12, the split washer is slid off the main member 26 and the member 26 is withdrawn from the piston. Then the piston is set on the base member 10 with the other bearing 16 down over and in registration with the well 12 and the removal of the bushing 18 from the bearing 16 and the placing of a new bushing in this bearing takes place in the same manner as with the first bearing.

Thus the setting of the members of my rebushing means in place and the application of a downward force or pressure are required to be done only twice for the rebushing of the two bearings in the piston.

While I have described my invention as employed for rebushing a piston, for which the use of the invention is primarily intended, obviously it could be employed in other cases of spaced, axially-aligned bearings, as for example in steering knuckle bearings of some automotive vehicles. In such other cases the work-supporting top face of the base member 10 would of course be modified to suit the particular element in which the bushings are to be replaced, but this would not mean any departure from the scope of my invention.

I claim:

In a device for rebushing pistons and the like having a pair of oppositely-arranged, axially aligned, bushing-lined bearings, a cylindrical bushing-removing member having a diameter approximately equal to the interior diameter of a bushing, said member having an annular flange at one end, the diameter of the periphery of said flange being approximately equal to the exterior diameter of a bushing, a cylindrical shaft having a diameter approximately equal to the interior diameter of a bushing, an end portion of reduced diameter centrally positioned and extending longitudinally on said shaft, a recess in the flanged end of said member of approximately the same diameter as said end portion to receive said end portion, said reduced end portion and said recess so arranged that when said end portion is inserted in said recess said shaft and said member will be in axial alignment, a split washer having an exterior diameter greater than the exterior diameter of a bushing, an annular shoulder on one face of said washer, the diameter of the outer periphery of said shoulder being approximately equal to the exterior diameter of a bushing, and a groove on said shaft near said end portion of said shaft for holding said split washer in place on said shaft, said groove spaced from said shaft end portion a distance equal approximately to the axial length of a bushing, whereby, when said member is set in a bushing in one of said bearings, with said flanged end over the inner end of said bushing, and said shaft is inserted inwardly through the opposite bearing and bushing and said end portion of said shaft brought into engagement with said member, a force exerted longitudinally through said shaft against said member will always be properly directed for the removal of the bushing in said first mentioned bearing, and whereby the placing of a new bushing and said split washer on said shaft as said shaft is brought into engagement with said member will enable said new bushing to be properly set in the bearing simultaneously with the removal of the old bushing therefrom.

References Cited in the file of this patent

UNITED STATES PATENTS

| Number | Name | Date |
| --- | --- | --- |
| 1,403,893 | Carter et al. | Jan. 17, 1922 |
| 1,501,815 | Seppmann | July 15, 1924 |
| 1,589,633 | Duton et al. | June 22, 1926 |
| 1,601,734 | Goode | Oct. 5, 1926 |
| 1,736,529 | Goeller | Nov. 19, 1929 |
| 1,981,925 | Russell et al. | Nov. 27, 1934 |
| 2,317,405 | Rutten | Apr. 27, 1943 |
| 2,497,498 | Hamilton | Feb. 14, 1950 |
| 2,586,222 | Hamilton | Feb. 19, 1952 |
| 2,596,549 | Hamilton | May 13, 1952 |